June 23, 1964  G. W. GRAVES  3,137,977
POLISHING METHOD AND APPARATUS
Filed Jan. 24, 1963  2 Sheets-Sheet 1

INVENTOR.
GEORGE W. GRAVES
BY
Gary, Desmond & Parker
ATTYS.

June 23, 1964

G. W. GRAVES 3,137,977

POLISHING METHOD AND APPARATUS

Filed Jan. 24, 1963

INVENTOR.
GEORGE W. GRAVES
BY
Gary, Desmond & Parker
ATTYS.

3,137,977
POLISHING METHOD AND APPARATUS
George W. Graves, Glenview, Ill., assignor to Buehler Ltd., Evanston, Ill., a corporation of Illinois
Filed Jan. 24, 1963, Ser. No. 253,552
8 Claims. (Cl. 51—119)

This invention relates to a novel method and means for producing a desirable polished surface on a metallographic specimen.

More particularly the present invention relates to novel method and means for producing a flat, polished scratch-free surface on a metallographic sample suitable for microscopic observation and wherein the sample may, for example, be a metal or an alloy, or ceramics, ores, etc., or combinations thereof.

It is an object of the present invention to accomplish the foregoing polishing by vibratory means resulting in orbital movement achieved by an orbit of an unbalanced motor, that is to say, by means of a polishing device which does not rotate but one which is rather held against rotation and wherein the specimen is mounted in a weighted holder freely disposed on a vibratory platen and permitted to move freely relative thereto as a result of a composite limited horizontal orbital and orbital tilting movement to which the platen is subjected.

Generally the objects of the present invention are accomplished by freely disposing a flattened surface of a solid to be polished, while said solid is mounted in a cylindrical weighted holder therefor, onto the surface of the peripherally confined circular resiliently supported and horizontally disposed platen and subjecting said platen, while restaining it against rotation, to vibration to cause said holder to track around the surface of said platen and to rotate about its own axis and to thereby polish said flat specimen particle surface to desired extent.

Other objects of the present invention, its details of construction, arrangement of apparatus, details by which the method may be accomplished, and the economies and advantages thereof will be further understood by reference to the accompanying drawings wherein.

Figure 2:
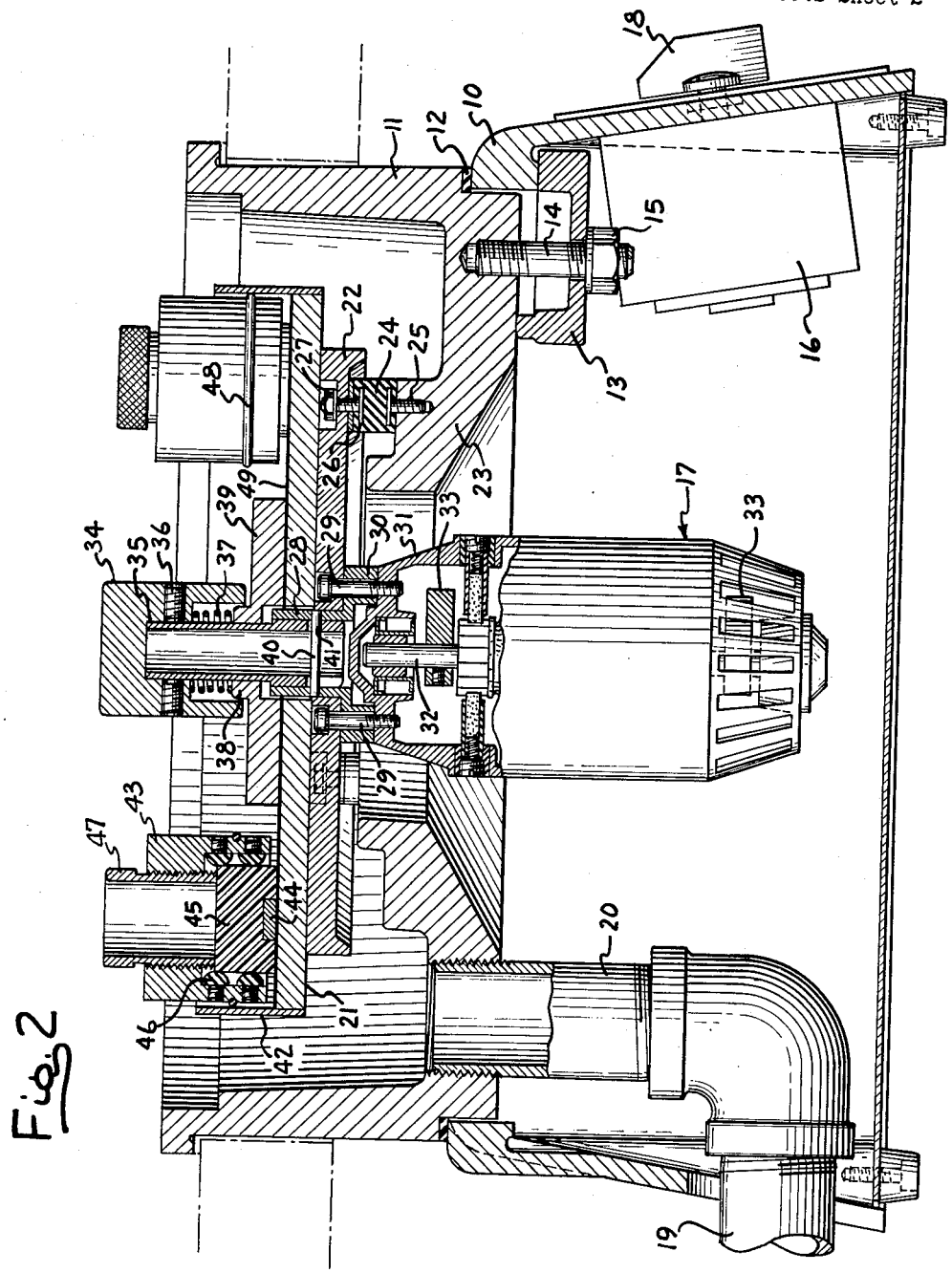
FIGURE 2 is a vertical section on line 2—2 thereof with some of the parts shown in full for purposes of illustration.

Referring to the drawings, the reference numeral 10 indicates a supporting base wherein a bowl component 11 is mounted thereon by means of a gasket 12. The base 10 and bowl 11 are shown to be secured together by suitable means such as the cleat 13, stud 14 and nuts 15, the stud 14 being screw-threaded into the base of the bowl 11. The base 10 provides a suitable mounting means for accessories such as the adjustable transformer 16 for the motor generally indicated as 17, and the exterior adjustable transformer knob 18. Likewise, at the diametrically opposed end of the base 10, as shown in FIGURE 2, there is provided the terminal conduit or nipple piece 19 leading from the drain pipe 20 opening into the bowl 11 for drainage of fluid materials which may be contained in or splash out of the platen 21, to be more fully described hereinafter.

The base 10 and bowl 11, although not essential to the present invention, provide suitable support and mounting means for the vibratible platen 21 and to support it firmly and securely in a horizontally disposed position. Actually, this vibratible platen 21 is mounted or seated on the drive plate 22 which in turn is resiliently supported and mounted on the annular inwardly extending arm portion 23 of bowl 11 by means of a plurality of equi-angularly spaced resilient means such as the rubber mountings or washers 24. Suitably, three of these are adequate and each has a stud 25 screwed into the bowl arm 23 and another stud 26 which extends through an aperture in the drive plate 22 and is secured thereto by a nut 27. This then retains the drive plate 22 in firm resiliently mounted disposition on the annular arm or rim 23 of bowl 11 in a resilient manner and subject to limited displacement thereon by a component of horizontal and vertical force which may act thereon.

This drive plate 22 is formed with an axial opening and seats therein what may be designated as a pilot bushing 28 which extends through the axial opening in the drive plate 22 and is secured by means of the screws 29 extending through the annular shoulder portion 30 of bushing 28 into one end of the casing 31 of motor 17. The motor 17 is thus mounted with its axial shaft 32 extending normal to and in alignment with the axis of drive plate 22, being otherwise unconnected. The opposed ends of shaft 32 have attached thereto eccentric weights 33, 33 which cause the motor to vibrate when it is actuated and in turn to cause vibration of the platen 21 to which the motor 17 as a whole is secured by means of the casing 31 while supported on its resilient mounts 24.

Vibratory platen 21 can then be separably mounted on the drive plate 22 by disposing it over the latter and with the axial opening of platen 21 embracing the bushing 28. The platen 21 and drive plate 22 are frictionally locked together against rotation by a resilient locking assembly comprising a knob 34 engaged to the sleeve 35 by means of set screws 36. The knob 34 is provided with an annular chamber embracing the sleeve 35 and seats therein the coil spring 37 which abuts against the shoulder 38 of the flanged plate 39 which is also carried by sleeve 35. When one bears down on knob 34 to press platen 21 against drive plate 22, the knob 34 is depressed against the spring 37, and by a slight twisting movement the sleeve 35 which is provided with a pair of bayonet slots becomes engaged to the locking pin 40 which is secured intermediate the length of bushing 28. This engagement of the platen 21 with the drive plate 22 or disengagement thereof if thus simply accomplished by turning the knob 34 so as to connect or disconnect its bayonet slotted portion 41 from the locking pin 40.

It will be understood that this engagement or disengagement is suitable for cleaning the platen 21 or for the cladding of its surface with abrasive or polishing cloths or paper. This platen 21 is peripherally confined by the rim 42 and provides a free annular seat between said rim 42 and the outer circumference on the flange 39.

Figure 1:
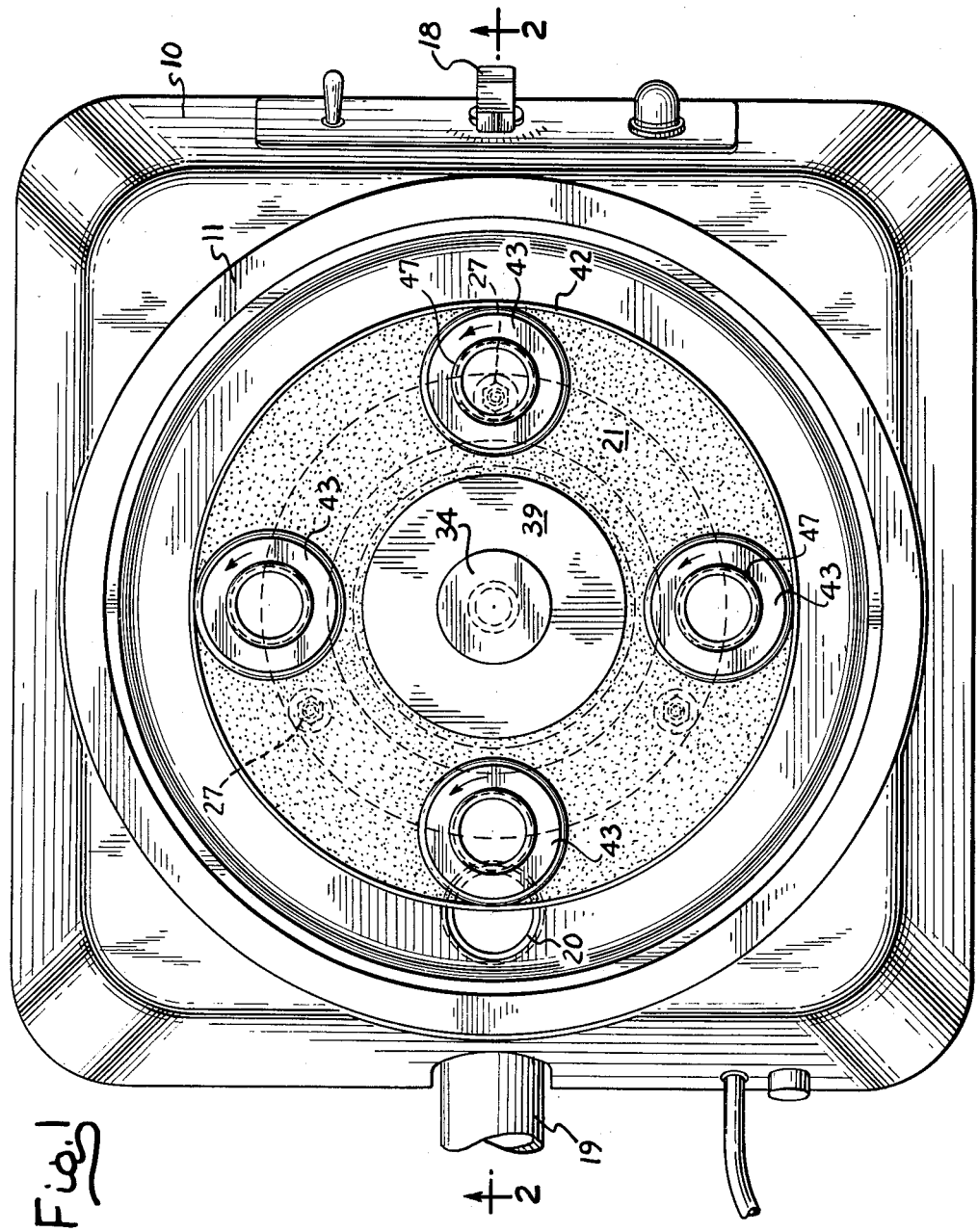
FIGURE 1 is a plan view of the device of the present invention.

FIGURE 2 further indicates several specimen holders disposed in platen 21. These as shown in FIGURE 1 can comprise a weighted cylindrical portion 43 having a chamber at the base thereof for receiving a specimen 44 to be polished while mounted in a body of material molded around it such as a synthetic hardened resin 45. This body 45 is suitably frictionally retained within the holder 43 by suitable retainers 46 which may be of a resilient character, or in the alternative can be adjustable screws such as set screws. The holder 43 can be further provided with a suitable adjusting screw means 47 for adjusting the distance which the sample holder 45 projects outwardly of the weighted cylinder 43 for polishing purposes. The weighted specimen holder suitably also is provided with an exterior O-ring bumper 48 for inhibiting clashing of a plurality of weighted units which may be disposed at one time in the platen 21 or against the outer retaining wall 42 thereof.

It will thus be seen from the illustrations in FIGURES 1 and 2 that the weighted specimen holders 43 are and can be freely disposed within the platen 21 and between the confines thereof comprising the outer retainer wall 42 and the flange 39. These weighted sample holders are not otherwise constrained and when the motor 17 is actuated for polishing purposes the platen 21 is caused to vibrate with a composite limited horizontal orbital and orbital tilting movement. The weighted specimen holders 43 resist such motion to some extent and are in part also caused to be moved or track relative to the platen 21, such motion being in a clockwise or counterclockwise direction, within the platen 21 and at the same time each holder also is caused by this motion to move about its own axis. The frequency of vibration can also be controlled to a desired degree by adjusting the speed of motor 17 by means of the transformer 16 and knob 18. This produces a novel polishing action and results in the production of a fine, scratch-free surface in a relatively simple manner.

It will be understood that the platen 21 may be faced with suitable abrasive paper or cloth material 49 as previously indicated and that it may contain plastics, waxes, and liquids such as oil or water to which suitable abrasives are or can be added, to produce the desired finish as known in the general art of producing polished samples of the class herein contemplated. Certain of these sheet materials such as fabric or paper may be actually held in place on the platen 21 by means of the rim or band 42, which as understood can be adapted to be removable.

It will thus be seen that I have produced a novel and economical method and means for substantially automatically and effectively producing flat, polished, scratch-free surfaces on metallographic samples suitable for microscopic observation.

I claim as my invention:

1. Means for producing a flat polished surface on a solid suitable for microscopic observation while mounted in a cylindrical weighted holder therefor, comprising a peripherally confined circular resiliently supported horizontally disposed platen for freely supporting said holder with its mounted solid disposed downwardly against the face of said platen, means restraining said platen against rotation, and means for subjecting said platen to simultaneous limited horizontal orbital motion and simultaneous orbital tilting to cause said holder to track around the surface of said platen and to rotate about its own axis and to thereby polish said weighted solid.

2. Means for producing a flat polished surface on a metallographic specimen suitable for microscopic observation, while mounted in a cylindrical weighted holder therefor comprising a peripherally confined circular resiliently supported horizontally disposed platen for freely supporting said holder with its mounted specimen disposed against the upper surface of said platen means restraining said platen against rotation, and means for subjecting said platen to simultaneous limited horizontal orbital movement and orbital tilting movement to cause said holder to track around the surface of said platen and to rotate about its own axis and to thereby polish said weighted specimen, said last mentioned means comprising an out-of-balance motor connected to said platen.

3. Means for producing a flat, polished, scratch-free surface on a solid object such as a metallographic sample suitable for microscopic observation comprising a peripherally confined circular platen carrying polishing material on its surface by freely disposing thereon a cylindrical weighted holder carrying said solid, with a flattened face of said solid exposed to the base of said holder, frictional means holding said platen restrained against rotation and horizontally disposed on equally spaced resilient supporting means therefor permitting limited movement of said platen in substantially horizontal and vertical directions, and out-of-balance motor means secured against said platen for subjecting said platen to vibration to provide a composite limited horizontal orbital and orbital tilting movement thereof in said directions and to thereby cause said holder to track around the surface of said platen and to rotate about its own axis and to thereby polish the surface of said solid in contact with said platen surface.

4. Means for producing a flat, polished, scratch-free surface on a solid object such as a metallographic sample suitable for microscopic observation comprising a peripherally confined circular platen carrying polishing material on its surface for freely receiving thereon a cylindrical weighted holder carrying said solid, with a flattened face of said solid exposed to the base of said holder, frictional spring pressed locking means holding said platen restrained against rotation and separably secured to a horizontally disposed drive plate, equally spaced resilient supporting means therefor secured to said drive plate and to a base support permitting limited movement of said platen in substantially horizontal and vertical directions, and means for subjecting said platen to vibration to provide a composite limited horizontal orbital and orbital tilting movement thereof in said directions and to thereby cause said holder to track around the surface of said platen and to rotate about its own axis and to thereby polish the surface of said solid in contact with said platen surface, comprising a motor having a casing, said casing only being secured to said drive plate with its shaft normal to and in alignment with the axis of said platen including offset weights, secured to the upper and lower ends of said shaft.

5. The structure of claim 4 wherein said platen is provided with a vertical peripheral wall, and the cylindrical weighted holders are provided with annular bumper rings, the engagement of said bumper rings with said wall assisting the tracking and rotation of said holders.

6. The structure of claim 4 wherein the platen and drive plate are provided with registering central openings, a horizontally flanged pilot bushing extends through said openings, screws connect the top of the motor casing with the horizontal flange of the bushing to afford a central connection only whereby the offset weight on the upper end of the shaft lying relatively close to the plane of the disc imparts said limited horizontal orbital movement thereto and the weight on the lower end of the shaft being axially spaced from the plane of the disc produces through the torque imparted to the shaft the orbital tilting movement of the platen.

7. Means for producing a flat, polished, scratch-free surface on a solid object such as a metallographic sample suitable for microscopic observation comprising a peripherally confined circular platen carrying polishing material on its surface for freely receiving thereon a cylindrical weighted holder carrying said solid, with a flattened face of said solid exposed to the base of said holder, means holding said platen secured to a horizontally disposed drive plate, equally spaced resilient supporting means therefor secured to said drive plate and to a base support permitting limited movement of said platen in substantially horizontal and vertical directions, and means for subjecting said platen to vibration to provide a composite limited horizontal orbital and orbital tilting movement thereof in said directions and to thereby cause said holder to track around the surface of said platen and to rotate about its own axis and to thereby polish the surface of said solid in contact with said platen surface, comprising a motor having a casing, said casing only being secured to said drive plate with its shaft normal to and in alignment with the axis of said platen including offset weights secured to the upper and lower ends of said shaft.

8. A method of producing a flat, polished, scratch-free surface on a solid object suitable for microscopic observation comprising the steps of imparting limited horizontal orbital movements to a disc which is resiliently anchored at peripheral points and simultaneously imparting orbital tilting movement to the disc and positioning articles to be polished on said disc, the combined limited horizontal orbital movement of the disc and the orbital tilting of the disc causing said articles to travel in an annular path over the surface of said disc and simultaneously to rotate about their own axes, while retaining the articles against horizontal displacement from the surface of the disc.

References Cited in the file of this patent

UNITED STATES PATENTS

| | | |
|---|---|---|
| 2,284,671 | Meinzer | June 2, 1942 |
| 2,984,951 | Coons et al. | May 23, 1961 |
| 3,088,247 | Mushrush | May 7, 1963 |